United States Patent
Orr

(10) Patent No.: US 8,144,630 B1
(45) Date of Patent: Mar. 27, 2012

(54) APPARATUS, SYSTEMS, METHODS, ALGORITHMS AND SOFTWARE FOR CONTROL OF NETWORK SWITCHING DEVICES

(75) Inventor: Michael Orr, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 267 days.

(21) Appl. No.: 11/999,846

(22) Filed: Dec. 6, 2007

Related U.S. Application Data

(60) Provisional application No. 60/870,230, filed on Dec. 15, 2006.

(51) Int. Cl.
*H04L 12/28* (2006.01)
*H04Q 11/00* (2006.01)
*G06F 15/16* (2006.01)
*G06F 15/177* (2006.01)

(52) U.S. Cl. ......... 370/257; 370/360; 709/209; 709/220
(58) Field of Classification Search ........................ None
See application file for complete search history.

(56) References Cited

U.S. PATENT DOCUMENTS

| | | | | |
|---|---|---|---|---|
| 6,785,272 B1* | 8/2004 | Sugihara | | 370/386 |
| 6,954,438 B2* | 10/2005 | Morley et al. | | 370/278 |
| 7,099,315 B2* | 8/2006 | Ambe et al. | | 370/386 |
| 7,478,152 B2* | 1/2009 | Holt et al. | | 709/223 |
| 7,480,258 B1* | 1/2009 | Shuen et al. | | 370/256 |
| 7,483,383 B2* | 1/2009 | Santoso et al. | | 370/244 |
| 7,593,320 B1* | 9/2009 | Cohen et al. | | 370/217 |
| 7,613,201 B1* | 11/2009 | Yang et al. | | 370/437 |
| 2005/0271044 A1* | 12/2005 | Hsu et al. | | 370/360 |
| 2006/0034235 A1* | 2/2006 | Yamane | | 370/338 |

* cited by examiner

*Primary Examiner* — Marcus R Smith

(57) ABSTRACT

Apparatuses, systems, methods, algorithms, and software for distributed control and/or configuration of network switching devices. The apparatus generally comprises a plurality of network I/O ports, a local control I/O port, and a controller configured to, when the apparatus is a master, receive control input data from at least one of the network I/O ports, process the control input data, and provide control output data to at least one of the network I/O ports, and when the apparatus is a slave, receive the control input data from the local control I/O port, provide the control input data to at least one of the network I/O ports, receive the control output data from at least one of the network I/O ports, and provide the control output data to the local control I/O port. The present disclosure advantageously enables control and/or configuration of a stack of network switch devices by communicating through a local control port of at least one of the devices in the stack.

23 Claims, 4 Drawing Sheets

APPARATUS, SYSTEMS, METHODS, ALGORITHMS AND SOFTWARE FOR CONTROL OF NETWORK SWITCHING DEVICES

RELATED APPLICATIONS

This application claims the benefit of U.S. Provisional Application No. 60/870,230, filed Dec. 15, 2006, the contents of which are incorporated herein by reference in its entirety.

FIELD

The present disclosure generally relates to the field of network switching devices. More specifically, embodiments of the present invention pertain to apparatuses, systems, methods, algorithms, and software for distributed control and/or configuration of network switching devices.

BACKGROUND

In modern data networks, network switches are often used to interconnect network devices. A network switch has several network I/O ports for coupling to network-connected devices, usually having on the order of four (4) to 48 such ports. When a data packet arrives at a network I/O port, the switch examines the destination address of the packet and forwards the packet to the appropriate network I/O port. The number of network I/O ports is generally constrained by the physical dimensions of the network cable interface structure (e.g., RG-45 plug interfaces in many Ethernet standards). In installations where more network I/O ports are needed than can be physically placed on a single network switching device (e.g., where a rack-mounted switching device for a standard 19" rack can comfortably accommodate approximately 48 network I/O ports), stackable switches may be used.

Referring now to FIG. 1, a stack 100 of stackable switches 110, 120, 130, and 140 is shown. Each stackable switch (e.g., switch 110) generally includes a plurality of network I/O ports 111 (e.g., comprising 10 megabit, 100 megabit, gigabit, and/or 10 gigabit Ethernet ports), status indicators 112 (e.g., connectivity and/or activity indicators for each port, power indicators, LCD displays for more detailed information, or any other status indication), local control I/O port 113 (e.g., an RS-232, V.24, an Ethernet port set up with an out-of-band [OOB] interface, or other data port), and one or more high-speed interconnection ports 114 (e.g., gigabit and/or 10 gigabit Ethernet ports). Each stackable switch generally has a CPU (not shown) to handle per-unit control-plane traffic and tasks.

Each stackable switch generally has to be configured to route network packets correctly. For example, quality of service (QoS) rules require the switch which first receives a packet to examine the packet and correctly assign a queue priority based on the QoS rules. Typically, many commands are required to properly configure a switch. As the number of stacked switches increases, the chance of making a mistake and the labor involved in programming each switch individually also increases.

Therefore, a number of conventional approaches to managing a stack of network switches have been used. Typically, a single switch (e.g., switch 110) may be designated a "master" switch, and the remaining switches (e.g., switches 120, 130, and 140) are designated "slave" switches. Generally, the switches in a stack communicate with one another via network connections (e.g., network connections 115, 125, and 135) between high speed network ports (e.g., high speed network ports 114, 124, 134, and 144). Often the switches are further connected in a ring configuration (e.g., comprising network connections 115, 125, 135, and 145) in order to provide robustness in the event that one of the links between the switches becomes cut or otherwise disabled.

All configuration is generally performed on the master switch 110, and the configuration may then be propagated to the slave switches 120, 130, and 140. For example, the master switch is generally given a network address (e.g., an IP address) for network configuration (e.g., by using a web browser to interact with a configuration application running as a server process on the network switch's CPU). However, when the stack is first set up, it may be difficult or impossible to know the correct network address for the configuration service (e.g., because a boot configuration server such as a BOOTP or DHCP server is not available, or because the boot configuration server provides a dynamic network address). Therefore, stackable switches often provide for configuration through a local control I/O port (e.g., a serial port).

A terminal device 150 (e.g., a dedicated terminal, a desktop or laptop computer with a direct port such as a serial port or OOB Ethernet port, or a remote device connected by modem) can be connected to the local serial control port 113 of master switch 110 through a serial data cable. Configuration changes can then be made by interfacing directly with the CPU of master switch 110 through the local control port 113 (e.g., by executing a command-line interactive configuration program running on the CPU of master switch 110 or by passing configuration commands using an established protocol over the local control port).

One difficulty with this approach is that it is sometimes difficult to know which network switch has been or will be designated the master switch. In some implementations, a network administrator may manually designate the master switch. In this case, it is relatively easy for the network administrator to know which switch is the master switch (assuming that the network administrator who is configuring the switch(es) has received this information from the network administrator who designated the master switch). However, many users prefer that switches in a stack automatically designate a master. Accordingly, many conventional network switches may be configured to automatically conduct an "election" protocol between the switches (e.g., by communicating between the switches on network connections 115, 125, 135, and/or 145) to designate the master switch. In this case, it may be difficult or impossible for a user to determine which switch will be designated the master before the stack has started and elected a master switch. Thus, it is may be necessary to wait for the boot process to finish and to be physically present to determine which switch is the master.

It may therefore be advantageous to enable control and/or configuration of a stack of network switches by communicating through a local control port of any one of the switches in the stack.

SUMMARY

Embodiments of the present invention relate to apparatuses, systems, methods, algorithms, and software for distributed control and/or configuration of network switching devices. The apparatus (e.g., a network switch device for directing packets in a data network) generally comprises a plurality of network I/O ports, a local control I/O port, and a controller configured to, when the apparatus is in a first state, receive control input data from any one of the network I/O ports, process the control input data, and provide control output data to any one of the network I/O ports, and when the apparatus is in a second state, receive the control input data from the local control I/O port, provide the control input data to any one of the network I/O ports, receive the control output data from any one of the network I/O ports, and provide the control output data to the local control I/O port.

In one embodiment, the apparatus is in the first state when the apparatus is a master switch in a stack of network switches and/or in the second state when the apparatus is a slave switch in a stack of network switches. In another embodiment, the controller is further configured, when the apparatus is in the first state (e.g., when the apparatus is a master switch), to receive the control input data from the local control I/O port, process the control input data from the local control I/O port, and provide the control output data to the local control I/O port. In one embodiment, the local control I/O port comprises a serial data port. In a further embodiment, the serial data port is configured to transmit and receive data according to an RS-232 and/or V.24 standard.

In an alternate exemplary embodiment, the plurality of network I/O ports comprises a plurality of network I/O ports of a first type (e.g., 10 megabit, 100 megabit, and/or 1 gigabit Ethernet) configured to transmit and/or receive data at a first data rate, and a network I/O port of a second type (e.g., 1 gigabit Ethernet and/or 10 gigabit Ethernet) configured to transmit and/or receive data at a second data rate, wherein the second data rate is faster than the first data rate.

In a further embodiment, the controller is configured to provide the control output data and/or the control input data to the network I/O port of the second type (e.g., to a higher speed network I/O port). The controller may also be configured to receive the control input data and/or the control output data from the network I/O port of the second type. In another embodiment, the controller is further configured, when the apparatus is in the first state (e.g., when the apparatus is a master switch), to provide configuration data to a second apparatus through any of the network I/O ports. Alternatively, when the controller is in the second state (e.g., when the apparatus is a slave switch), the controller may be configured to receive configuration data from a second apparatus through any of the network I/O ports. In still another embodiment, however, the controller is configured to provide configuration data to and/or receive configuration data from a second apparatus through the network I/O port of the second type.

In another embodiment, the apparatus is configured to determine which state to enter (e.g., first/master or second/slave) by conducting an election among itself and other apparatuses on the network. Thus, the controller may be configured to send first election data to one or more additional apparatuses through any one of the network I/O ports, receive second election data from at least one of the additional apparatuses through any of the network I/O ports, and enter the first state or the second state in response to the first and second election data.

In still another embodiment, the controller is configured to encapsulate the control output data (e.g., when the apparatus is in the first/master state) and/or the control output data (e.g., when the apparatus is in the second/slave state) according to the Serial-on-LAN standard before transmitting the data on a network I/O port. Thus, the controller may also be configured to unencapsulate the control output data and/or the control output data according to the same standard when receiving the data from a network I/O port.

The systems generally comprise those that include one or more apparatuses embodying one or more of the inventive concepts disclosed herein. A network according to embodiments of the present invention includes a plurality of the above-described network switch apparatuses communicatively coupled to each other (e.g., through one or more network I/O ports, preferably through higher speed I/O ports), and a plurality of storage or communications devices (e.g., servers, workstations, personal computers, network appliances, network-attached storage devices, etc.), each of the storage or communications devices being communicatively coupled to one of the apparatuses (e.g., through any of the network I/O ports on any one of the network switch apparatuses). In a further embodiment, the plurality of apparatuses comprises exactly one of the apparatuses in the first state (e.g., a master switch) and at least one of the apparatuses in the second state (e.g., a slave switch).

The method for controlling a network switching device generally includes the steps of determining a state of the device and, when the device is in a first state (e.g., when the device is a master switch), receiving control input data from any one of a plurality of network I/O ports of the device, processing the control input data, and providing control output data to any one of the network I/O ports, and, when the device is in a second state (e.g., when the device is a slave switch), receiving the control input data from a local control I/O port, providing the control input data to any one of the network I/O ports, receiving the control output data from any one of the network I/O ports, and providing the control output data to the local control I/O port.

In a further embodiment, the method includes, when the device is in the first state, receiving the control input data from the local control I/O port, processing the control input data from the local control I/O port, and providing the control output data to the local control I/O port. The local control I/O port may comprise a serial data port, but other arrangements are also possible.

In another embodiment, the method includes, when the device is in the first/master state, providing configuration data to another device (e.g., a slave switch) through any one of the network I/O ports. Alternatively, when the device is in the second/slave state, the method may include receiving configuration data from another device (e.g., from a master switch) through any one of the network I/O ports.

In one embodiment, determining the state of the device includes the steps of sending first election data to one or more additional devices through any one of the network I/O ports, receiving second election data from at least one of the additional devices through any one of the network I/O ports, and selecting the state of the device in response to the first and second election data. In another embodiment, determining the state of the device comprises retrieving a previously determined state from a data storage.

In another embodiment, processing the control input data comprises running a command-line interface configuration program, wherein the control input is input to the program, and the control output is output from the program. In still another embodiment, the method includes encapsulating the control output data and/or the control input data in at least one network transmission packet. In a further embodiment, encapsulating comprises encoding the control output data and/or the control input data according to the Serial-on-LAN standard.

Embodiments of the present invention advantageously enable control and/or configuration of a stack of network switches by communicating through a local control port of any one of the switches in the stack. These and other advantages of the present invention will become readily apparent from the detailed description of embodiments below.

DETAILED DESCRIPTION

Figure 1:
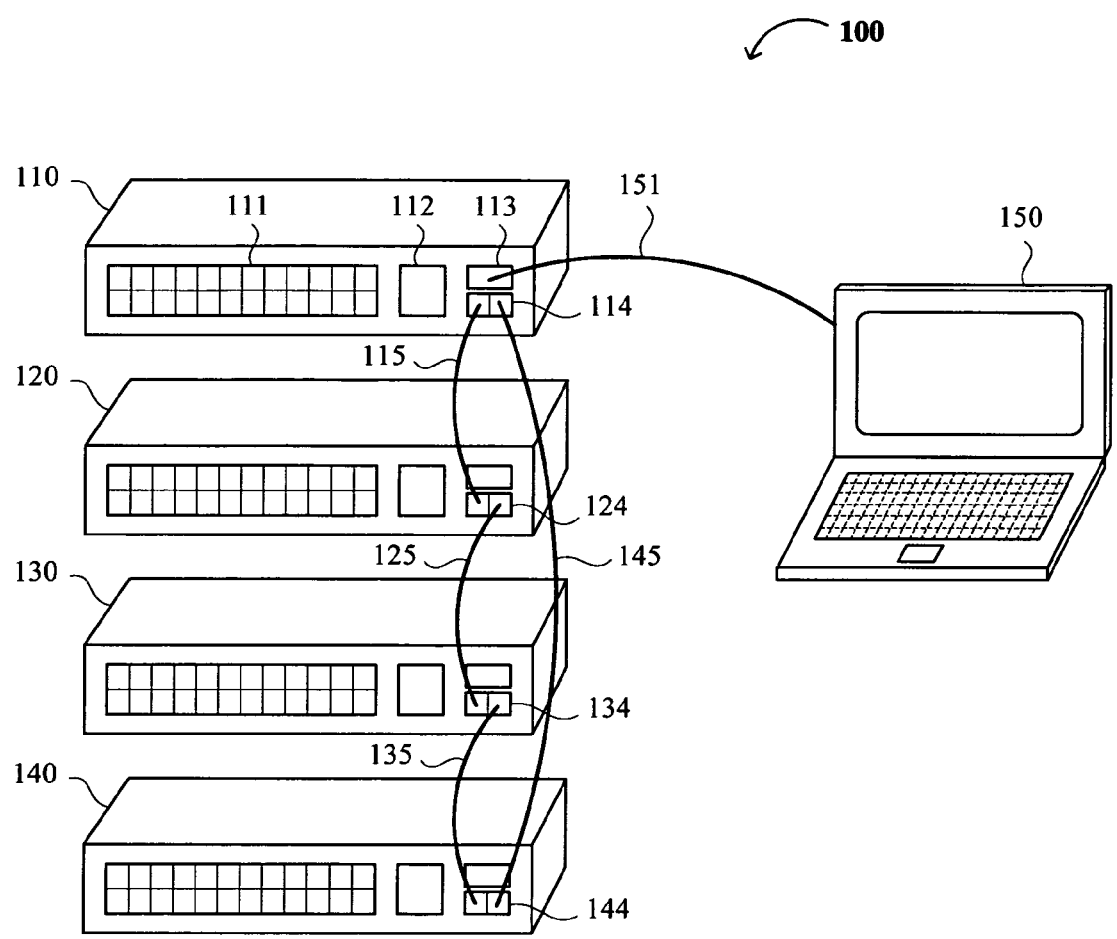
FIG. 1 is a diagram showing a conventional stack of network switch devices with a control terminal.

Reference will now be made in detail to the embodiments of the invention, examples of which are illustrated in the accompanying drawings. While the invention will be described in conjunction with the embodiments, it will be understood that they are not intended to limit the invention to these embodiments. On the contrary, the embodiments of the invention are intended to cover alternatives, modifications and equivalents that may be included within the spirit and scope of the invention as defined by the appended claims. Furthermore, in the following detailed description of the embodiments of the present invention, numerous specific details are set forth in order to provide a thorough understanding of the embodiments. However, it will be readily apparent to one skilled in the art that the embodiments of the present invention may be practiced without these specific details. In other instances, well-known methods, procedures, components, and circuits have not been described in detail so as not to unnecessarily obscure aspects of the embodiments of the present invention.

Some portions of the detailed descriptions which follow are presented in terms of processes, procedures, logic blocks, functional blocks, processing, and other symbolic representations of operations on data bits, data streams or waveforms within a computer, processor, controller and/or memory. These descriptions and representations are generally used by those skilled in the data processing arts to effectively convey the substance of their work to others skilled in the art. A process, procedure, logic block, functional block, operation, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer, data processing system, or logic circuit. It has proven convenient at times, principally for reasons of common usage, to refer to these signals as bits, waves, waveforms, streams, values, elements, symbols, characters, terms, numbers, or the like.

It should be borne in mind, however, that all of these and similar terms are associated with the appropriate physical quantities and are merely convenient labels applied to these quantities. Unless specifically stated otherwise and/or as is apparent from the following discussions, it is appreciated that throughout the present application, discussions utilizing terms such as "processing," "operating," "computing," "calculating," "determining," "manipulating," "transforming," "displaying" or the like, refer to the action and processes of a computer, data processing system, logic circuit or similar processing device (e.g., an electrical, optical, or quantum computing or processing device), that manipulates and transforms data represented as physical (e.g., electronic) quantities. The terms refer to actions, operations and/or processes of the processing devices that manipulate or transform physical quantities within the component(s) of a system or architecture (e.g., registers, memories, other such information storage, transmission or display devices, etc.) into other data similarly represented as physical quantities within other components of the same or a different system or architecture.

Furthermore, for the sake of convenience and simplicity, the terms "clock," "time," "rate," "period" and "frequency" are generally used interchangeably herein, but are generally given their art-recognized meanings. Also, for convenience and simplicity, the terms "data," "data stream," "waveform" and "information" may be used interchangeably, as may the terms "connected to," "coupled with," "coupled to," and "in communication with" (which terms also refer to direct and/or indirect relationships between the connected, coupled and/or communication elements unless the context of the term's use unambiguously indicates otherwise), but these terms are also generally given their art-recognized meanings.

The invention, in its various aspects, will be explained in greater detail below with regard to exemplary embodiments.

An Exemplary Circuit and/or Architecture

Figure 2A:
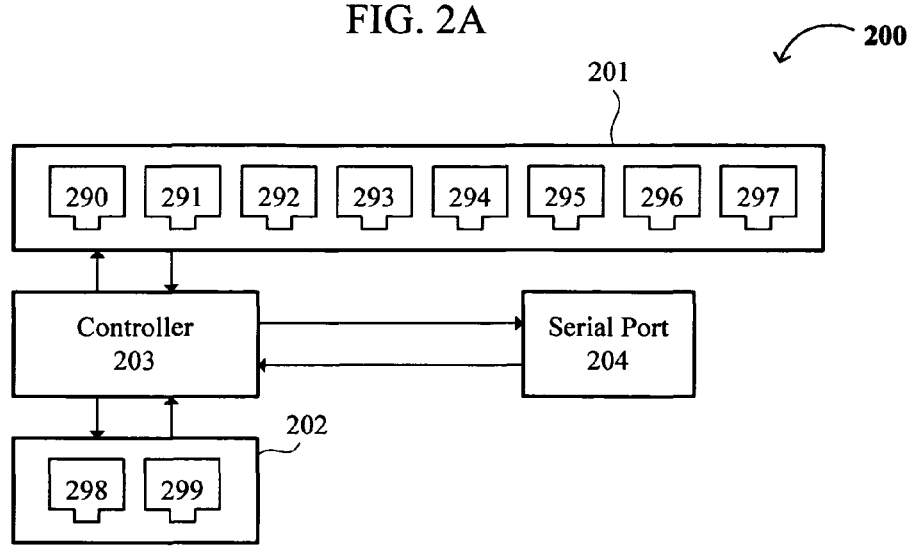
FIG. 2A is a block diagram showing a stackable network switch device according to an exemplary embodiment of the present invention.

FIG. 2A shows a first exemplary embodiment of an apparatus 200 for directing packets in a data network. Apparatus 200 generally comprises a plurality of network I/O ports 201 and 202, a local control I/O port 204 (e.g., a serial port), and controller 203. In an exemplary embodiment the apparatus 200 acts as network switch. Thus, when a data packet arrives at a one of the network ports 290-299, the controller 203 examines the destination address of the packet and forwards the packet to the appropriate network I/O port 290-299.

Figure 2B:
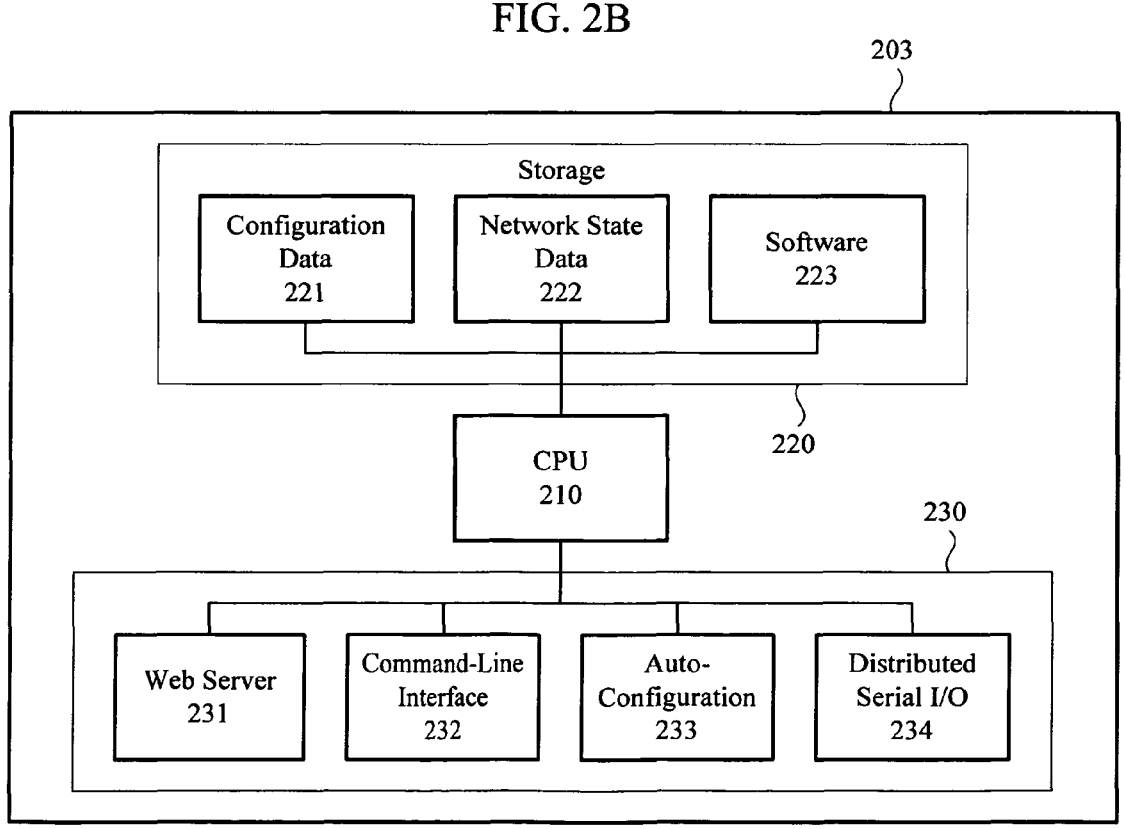
FIG. 2B is a block diagram showing a network switch controller according to an exemplary embodiment of the present invention.

Referring now to FIG. 2B, the controller 203 may comprise, for example, storage 220 and CPU 210 or other integrated circuit device (e.g., an application-specific integrated circuit). CPU 210 generally executes software and/or firmware 230 for directing network packets and/or for other applications. Storage 220 may comprise volatile memory, non-volatile memory, magnetic storage, optical storage, other data storage devices, and/or any combination of these. Storage 220 may include, for example, configuration data storage 221, network state data storage 222 (e.g., for stateful inspection of network packets), software and/or firmware storage 223 (e.g., for storing object code, source code, or any other machine-readable format for instructing CPU 210 to execute software and/or firmware 230), and/or any other data used by controller 203. Software and/or firmware 230 may include a web server configuration interface 231, a command line interface 232, auto-configuration software 233 (e.g., for electing a master and/or other automatically configured settings in a stack of network switches), and/or distributed serial I/O software 234 (e.g., implementing methods and/or configuration according to the present invention).

Web server configuration interface 231 and command-line interface 232 may both be used to interactively modify configuration data 221. The configuration data 221 may control the behavior of the apparatus 200 with respect to the network address of the apparatus 200, access control (e.g., user ids, passwords, and/or other access control for altering the configuration), port-specific configuration (e.g., to enable, disable, specify speed, specify flow control, etc., for individual network I/O ports 290-299), Quality of Service parameters, virtual LANs, or any other configuration parameter available for the device. Generally, the web server configuration interface 231 can be accessed by a client computer with network access to the apparatus 200 (e.g., directly or indirectly through any of the network I/O ports 290-299 of FIG. 2A).

The command-line configuration interface 232 can generally be accessed by a client device with network access to the computer (e.g., through a telnet, SSH, or other network-based terminal emulation application) or by a terminal device (e.g., a dedicated terminal device, a modem, and/or a computer running a serial terminal emulation application) connected to the local serial I/O port 204. Local serial I/O port 204 is generally configured to transmit and receive data according to the RS-232 standard and/or the V.24 standard.

Multiple network switches may be stacked by networking the switches together (and are often physically stacked in one or more equipment racks). The switches may be networked together using higher speed network I/O ports. For example, referring again to FIG. 2A, switch apparatus 200 may include network I/O ports 290-297 configured to transmit and/or receive data at a first data rate (e.g., 10 megabit, 100 megabit, and/or 1 gigabit Ethernet ports), and network I/O ports 298 and 299 configured to transmit and/or receive data at a second, higher data rate (e.g., 1 gigabit and/or 10 gigabit Ethernet ports). Thus, the higher speed ports 298 and 299 can be coupled to additional switches to form a high speed bus for transmitting data between the switches.

Figure 3:
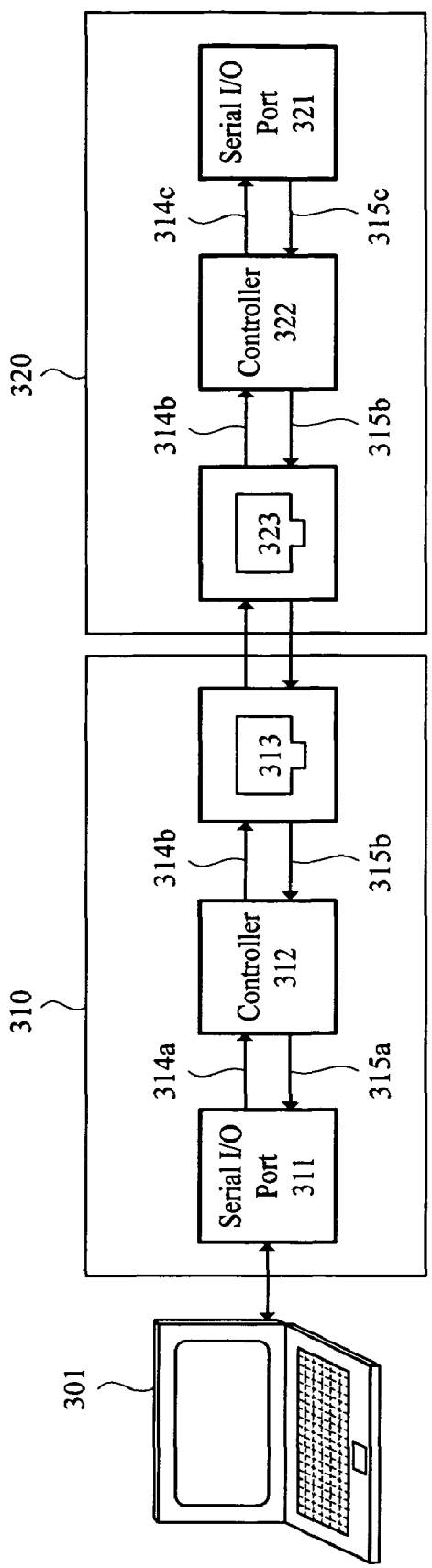
FIG. 3 is a block diagram showing a master network switch and a slave network switch according to the exemplary embodiments of present invention.

In the stacked configuration, one of the switches may be the "master" and run the configuration application(s). The remaining "slave" switches receive their configuration data from master. Referring now to FIG. 3, two network switch apparatuses according to an embodiment of the present invention are shown. Apparatuses 310 and 320 may be substantially identical, each having a serial I/O port 311/321, a controller 312/322, and at least one network I/O port 313. In this example, apparatus 320 is the master, and apparatus 310 is the slave.

A terminal device 301 may be coupled to slave apparatus 310. Conventionally, a slave switch would ignore any input from its local control I/O port. In a device according to the embodiments of the present invention, however, the input from the local control I/O port 311 of slave apparatus 310 is forwarded to the master apparatus 320 for processing. Thus, controller 312 of slave apparatus 310 receives the control input data 314a from the local control I/O port 311 and provides the control input data 314b to network I/O port 313. Network I/O port 313 may be any of the available network I/O ports (e.g., network I/O ports 290-299 of FIG. 2A), including a higher speed network I/O port (e.g., one of the network I/O ports 298 and 299 of FIG. 2A).

Controller 312 may be further configured to encapsulate control input data 314a into a network transport stream 314b (e.g. a network transport stream comprising one or more network transport packets). For example, controller 312 may be configured to encode serial control input data 314a from serial I/O port 311 using the Serial-on-LAN standard, as is known in the art. Control input data 314b may then be transmitted over the network to network I/O port 323 of master device 320.

Controller 322 of master apparatus 320 receives the control input data 314b from network I/O port 323 and processes the control input data. If control input data 314b is encapsulated, then controller 322 may be configured to unencapsulate it to recover the original control input data 314a.

In an exemplary embodiment, controller 322 runs a command-line interactive configuration program (e.g., software and/or firmware program 232 of FIG. 2B) using the control input data as input to the program. Output of the program may be encapsulated in an output network transport stream 315b (e.g., using the Serial-on-LAN standard, addressed to the slave apparatus 310, and transmitted on network I/O port 323 (which may or may not be the same network I/O port from which the control input data was received). When there is more than one slave apparatus 310 on the network, it may be desirable to address the output transport stream to the slave apparatus which sent the input data stream 314b, which is well within the abilities of a person skilled in the art.

Controller 312 then receives the control output data 315b from network I/O port 313 and then provides control output data 315a to local serial I/O port 311 (thereby providing the control output data to terminal device 301). Controller 312 in slave apparatus may be configured to unencapsulate control output data 315a from control output data 315a if control output data 315a comprises an encapsulated transport stream. The master apparatus 320 may also receive control input data directly through its own local serial I/O port 321. Thus, controller 322 may be configured to receive control input data from the local control I/O port 321, process the control input data (e.g., by processing it as input to command-line configuration interface program 232 of FIG. 2B), and provide control output data to the local control I/O port 321. Thus, an administrator of a stack of network devices according to the embodiments of the present invention can configure the stack coupling terminal device 301 to a serial I/O port 311 of any slave apparatus in the stack and configure the master switch, without knowing which device is the master switch.

Referring again to FIG. 2A, apparatus 200 may be configured to determine which state to enter (e.g., master or slave) by conducting an election (e.g., by running auto-configuration software and/or firmware 233 of FIG. 2B) among itself and other apparatuses on the network. Thus, the controller 203 may be configured to send first election data to one or more additional apparatuses through any one of the network I/O ports 290-299 (but preferably through one or more of the high speed network I/O ports 298 and 299), receive second election data from at least one of the additional apparatuses through any of the network I/O ports, and enter the master state or the slave state in response to the first and second election data. It is well within the ability of a person skilled in the art to implement an appropriate election protocol.

The Network

Further aspects of the exemplary embodiments of the invention concern a network comprising a plurality of the above-described network switch apparatuses (e.g., network switch apparatuses 200 of FIG. 2A) communicatively coupled to each other (e.g., through one or more network I/O ports, such as through higher speed ports such as network I/O ports 298 and 299 of FIG. 2A), and a plurality of storage or communications devices, each of the storage or communications devices being communicatively coupled to one of the apparatuses (e.g., through any of the network I/O ports on any one of the network switch apparatuses, such as network I/O ports 290-297 of FIG. 2A). In exemplary embodiments, the plurality of apparatuses comprises exactly one master apparatus (e.g., master apparatus 320 of FIG. 3) at least one of slave apparatus (e.g., slave apparatus 310 of FIG. 3).

Exemplary Methods

Figure 4:
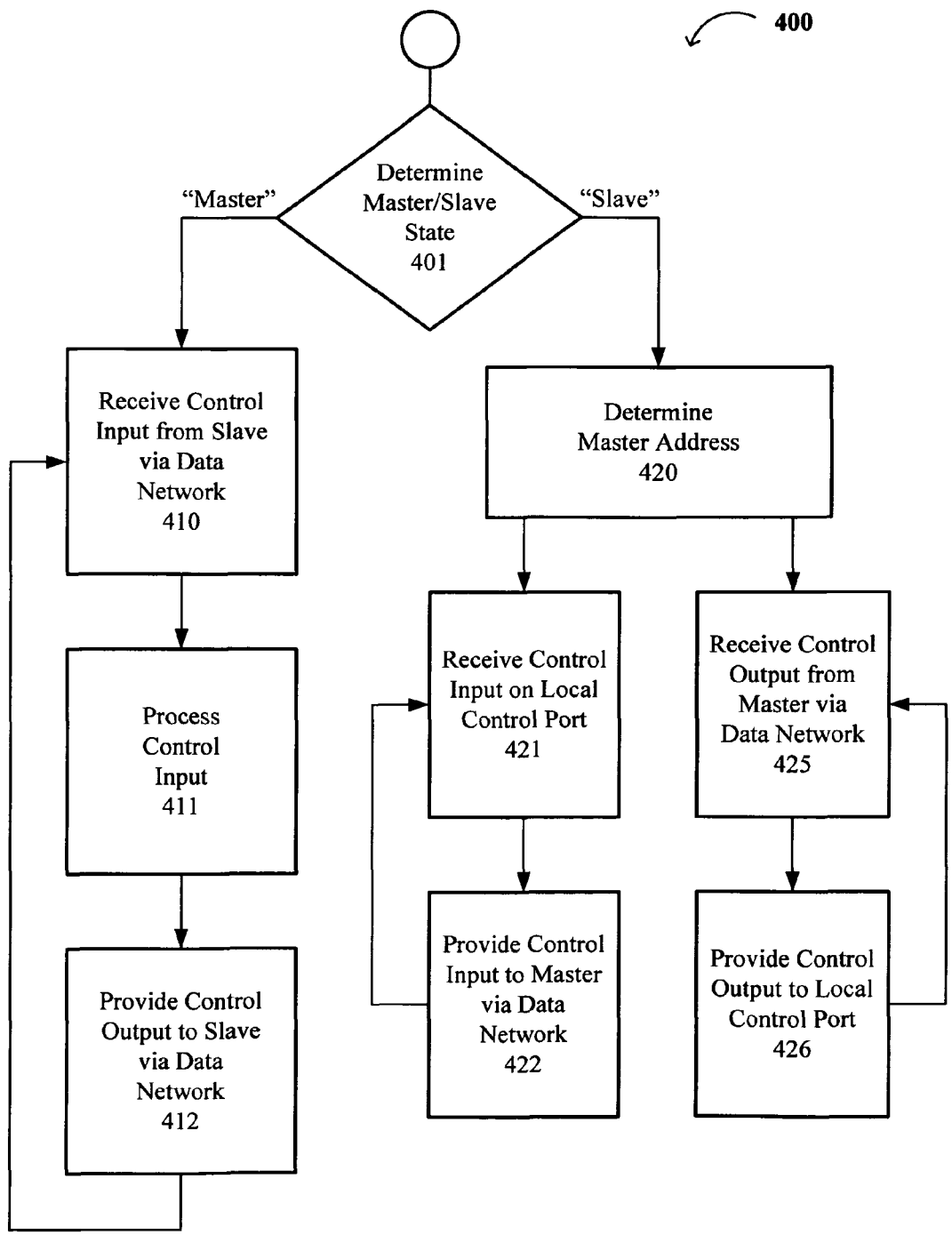
FIG. 4 is a flow chart of a method for controlling a network switch according to exemplary embodiments of the present invention.

FIG. 4 shows a flow chart explaining an exemplary method for controlling a network switching device. At step 401, the method first comprises determining a state of the device (e.g., whether the device is a master or a slave in a stack of network switching devices). Step 401 may include conducting an election among the network switching devices in a stack. Thus, step 401 may include sending first election data to one or more additional devices through one of network I/O ports of the device (e.g., ports 298 and/or 299 of FIG. 2A), receiving second election data from at least one of the additional devices through one of the network I/O ports, and selecting the state of the device in response to the first and second election data. Alternatively, step 401 may include retrieving a previously determined state from a data storage (e.g., the result of a previous election).

If the method determines at step 401 that the device is a master, then the method proceeds to step 410 of receiving control input data from a slave via the data network (e.g., through network I/O port 298 and/or 299 of FIG. 2A). If the control input data is encapsulated in a network transport stream (e.g., according to the Serial-on-LAN standard or other protocol for encapsulating control and/or serial data into a network transport stream), then step 410 may also include unencapsulating the network transport stream to obtain the control input data.

At step 411, the method includes processing the control input data. Processing step 411 may include running a command-line interactive configuration program (e.g., software and/or firmware program 232 of FIG. 2B) using the control input data as input to the program. At step 412, the method includes providing control output data to any one of the network I/O ports. The control output data may comprise output of the command-line interactive configuration program. Step 412 may also comprise encapsulating the control output data in a network transport stream (e.g., according to the Serial-on-LAN standard or other protocol). While the device is a master, it may continue to receive and process control input and produce control output according to steps 410 to 412.

If the method determines at step 401 that the device is a slave, then the method proceeds to step 420 of determining the address of the master device. The address of the master device may have been learned during the election at step 401, or may be the result of a previous election recovered from a data storage.

At step 421, the method includes receiving the control input data from a local control I/O port. The local control I/O port may comprise a serial data port, such as serial I/O port 204 of FIG. 2A. The local control I/O port is generally coupled to a terminal device, a computer running a terminal emulation application, a modem, or other device for controlling and/or configuring the network switch through the local control port.

At step 422, the method includes providing the control input data to any one of the network I/O ports. Step 422 may also comprise encapsulating the control input data in a network transport stream (e.g., according to the Serial-on-LAN standard or other protocol) and addressing the network transport stream to a master device, using the network address determined at step 420. At step 425, the method includes receiving the control output data (e.g., data provided by a master device after processing the control input data) from any one of the network I/O ports. Step 425 may also comprise receiving the control output data from a high speed network I/O port (such as port 298 or 299 of FIG. 2A). Step 425 may also comprise unencapsulating the control output data from an output network transmission stream. At step 426, the method includes providing the control output data to the local control I/O port.

If the method determines at step 401 that the device is a master, then the method may also include, providing configuration data to the slave devices through any one of the network I/O ports. Thus, when the master configuration is changed by running a configuration application (e.g., interactive web server configuration interface 231 and/or command-line interactive configuration interface 232 of FIG. 2B), the new configuration can be transmitted to the slave devices to keep all of the switches in the stack updated. Conversely, when the method determines at step 401 that the device is in the slave state, the method may include receiving configuration data from a master device through the network.

Exemplary Software

The exemplary embodiments of the present invention also include algorithms, computer program(s), and/or software, implementable and/or executable in a general purpose central processing unit (e.g., CPU 210 of controller 203 in FIG. 2B) and/or one or more application specific integrated circuits, configured to perform one or more steps of the method and/or one or more operations of the hardware. Thus, a further aspect of the exemplary embodiments relate to algorithms and/or software that implement the above method(s). For example, the exemplary embodiments may further relate to a computer program, computer-readable medium or waveform containing a set of instructions which, when executed by an appropriate processing device (e.g., a signal processing device, such as a microcontroller, microprocessor or ASIC device), is configured to perform the above-described method and/or algorithm.

For example, the computer program may be on any kind of computer-readable medium, and the computer-readable medium may comprise any medium that can be read by a processing device configured to read the medium and execute code stored thereon or therein, such as a floppy disk, CD-ROM, magnetic tape, hard disk drive, flash memory, read-only memory (ROM), and/or programmable read-only memory (PROM). Such code may comprise object code, source code and/or binary code.

The waveform is generally configured for transmission through an appropriate medium, such as copper wire, a conventional twisted pair wireline, a conventional network cable, a conventional optical data transmission cable, or even air or a vacuum (e.g., outer space) for wireless signal transmissions. The waveform and/or code for implementing the present method(s) are generally digital, and are generally configured for processing by a conventional digital data processor (e.g., a microprocessor, microcontroller, or logic circuit such as a programmable gate array, programmable logic circuit/device, or application-specific [integrated] circuit).

In various embodiments, the computer-readable medium or waveform comprises at least one instruction to determine a state of a network switch device and, when the device is in a first state (e.g., when the device is a master switch), receive control input data from any one of a plurality of network I/O ports of the device, process the control input data, and provide control output data to any one of the network I/O ports, and, when the device is in a second state (e.g., when the device is a slave switch), receive the control input data from a local control I/O port, provide the control input data to any one of the network I/O ports, receive the control output data from any one of the network I/O ports, and provide the control output data to the local control I/O port.

CONCLUSION/SUMMARY

Thus, the exemplary embodiments of the present invention provide an apparatus, system, method, algorithm, and software for controlling and/or configuring the operation of one or more network switch devices. The exemplary embodiments of the present invention advantageously enable control and/or configuration of a stack of network switch devices by communicating through a local control port of any one of the devices in the stack.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An apparatus for routing packets in a data network, said apparatus being configured to operate in a first state or a second state, said apparatus comprising:
    a plurality of network I/O ports, wherein each of said plurality of network Input/Output (I/O) ports i) is associated with a first communications interface and ii) is configured to be communicatively connected to said data network;
    a local control I/O port, wherein said local control I/O port is associated with a second communication interface that is different from the first communication interface associated with each of said plurality of network I/O ports; and
    a controller configured to:
    in response to i) said apparatus operating in said first state, and ii) said apparatus receiving control input data from at least one of said plurality of network I/O ports,
        process said control input data to i) configure said apparatus to correctly route packets among said plurality of network I/O ports, and ii) generate control output data for configuring a second apparatus, and
        provide said control output data to said second apparatus via at least one of said plurality of network I/O ports; and
    in response to i) said apparatus operating in said first state, and ii) said apparatus receiving said control input data from said local I/O port,
        process said control input data to i) configure said apparatus to correctly route packets among said plurality of network I/O ports, and ii) generate control output data for configuring a second apparatus, and
        provide said control output data to said second apparatus via at least one of said plurality of network I/O ports;
    in response to i) said apparatus operating in said second state, and ii) said apparatus receiving said control input data from said local control I/O port,
        determine a second apparatus to which said control input data should be provided, and providing said control input data to said second apparatus via at least one of said plurality of network I/O ports,
        receive control output data from at least one of said plurality of network I/O ports, said control data having been generated by said second apparatus based on said control input data provided to said second apparatus, and
        configure said apparatus to correctly route packets among said plurality of network I/O ports based on said control output data.

2. The apparatus of claim 1, wherein said apparatus is in said first state when said apparatus is a master switch in a stack of network switches.

3. The apparatus of claim 2, wherein said apparatus is in said second state when said apparatus is a slave switch in said stack of network switches.

4. The apparatus of claim 1, wherein:
    in response to i) said apparatus operating in said second state, and ii) said apparatus receiving said control input data from said local control I/O port, said controller is further configured to:
        provide said control output data to said local control I/O port.

5. The apparatus of claim 1, wherein said local control I/O port comprises a serial data port.

6. The apparatus of claim 5, where said serial data port is configured to transmit and receive data according to at least one of an RS-232 and V.24 standard.

7. The apparatus of claim 1, wherein said plurality of network I/O ports comprises:
    a plurality of network I/O ports of a first type configured to transmit and/or receive data at a first data rate;
    a network I/O port of a second type configured to transmit and/or receive data at a second data rate, wherein said second data rate is different from said first data rate.

8. The apparatus of claim 7, wherein said controller is configured to provide at least one of said control output data and said control input data to said network I/O port of said second type.

9. The apparatus of claim 7, wherein said controller is configured to receive at least one of said control input data and said control output data from said network I/O port of said second type.

10. The apparatus of claim 7, wherein said controller is further configured, when said apparatus is operating in said first state, to provide configuration data to a second apparatus through said network I/O port of said second type.

11. The apparatus of claim 10, wherein said controller is further configured, when said apparatus is operating in said second state, to receive configuration data from a second apparatus through said network I/O port of said second type.

12. The apparatus of claim 1, wherein said controller is further configured, when the apparatus is operating in said second state, to receive configuration data from a second apparatus through at least one of said plurality of network I/O ports.

13. The apparatus of claim 1, wherein said controller is further configured to:
    send first election data to one or more additional apparatuses through any one of said plurality of network I/O ports;
    receive second election data from at least one of said additional apparatuses through at least one of said plurality of network I/O ports; and
    enter said first state or said second state in response to said first election data and said second election data.

14. The apparatus of claim 1, wherein said controller is configured to encapsulate said control output data and/or said control input data according to a Serial-on-LAN standard.

15. A network, comprising:
    a plurality of the apparatuses of claim 1, communicatively coupled to each other;
    a terminal device communicatively coupled to at least one of said plurality of apparatuses; and
    a plurality of storage or communications devices, each of said plurality of storage or communications devices being communicatively coupled to at least one of said plurality of apparatuses.

16. The network of claim 15, wherein said plurality of apparatuses comprises exactly one of said plurality of apparatuses in said first state, and at least one of said plurality of apparatuses in said second state.

17. A method for controlling a network switching device having a plurality of network I/O ports, wherein each of said plurality of network I/O ports i) is associated with a first communication interface and ii) is configured to be communicatively connected to a data network and a local control I/O port, wherein said local control I/O port is associated with a second communication interface that is different from the first communication interface associated with each of said plurality of network I/O ports, said network switching device being configured to operate in a first state or a second state, said terminal device not communicatively connected to said data network, said method comprising:

determining a state of said network switching device;

in response to i) said network switching device operating in said first state, and ii) said network switching device receiving control input data from at least one of said plurality of network I/O ports, processing said control input data to i) configure said network switching device to correctly route packets among said plurality of network I/O ports, and ii) generate control output data for configuring a second network switching device, and providing said control output data to said second network switching device via at least one of said plurality of network I/O ports; and in response to i) said network switching device operating in said first state, and ii) said apparatus receiving said control input data from said local I/O port, processing said control input data to i) configure said network switching device to correctly route packets among said plurality of network I/O ports, and ii) generate control output data for configuring a second network switching device, and providing said control output data to said second network switching device via at least one of said plurality of network I/O ports;

in response to i) said network switching device operating in said second state, and ii) said network switching device receiving said control input data from said local control I/O port, determining a second network switching device to which said control input data should be provided, and providing said control input data to said second network switching device via at least one of said plurality of network I/O ports, receiving control output data from at least one of said plurality of network I/O ports, said control data having been generated by said second network switching device based on said control input data provided to said second network switching device, and configuring said network switching device to correctly route packets among said plurality of network I/O ports based on said control output data.

18. The method of claim 17, further comprising, in response to i) said network switching device operating in said second state, and HO said network switching device receiving said control input data from said local control I/O port, providing said control output data to said local control I/O port.

19. The method of claim 17, further comprising, when said network switching device is operating in said second state, receiving configuration data from a second network switching device through at least one of said plurality of network I/O ports.

20. The method of claim 17, wherein determining said state of said device comprises:

sending first election data to one or more additional devices through at least one of said plurality of network I/O ports;

receiving second election data from at least one of said additional devices through at least one of said plurality of network I/O ports; and selecting said state of said device in response to said first election data and said second election data.

21. The method of claim 17, wherein determining said state of said network switching device comprises retrieving a previously determined state from a data storage.

22. The method of claim 17, further comprising encapsulating said control output data and/or said control input data in at least one network transmission packet.

23. The method of claim 17, wherein processing said control input data comprises running a command-line interface configuration program, wherein said control input is input to said program, and said control output is output from said program.

* * * * *